Aug. 31, 1954 W. W. PUCKETTE 2,687,891
SEED AND FERTILIZER DISTRIBUTOR FOR ATTACHMENT TO TRACTORS
Filed Nov. 4, 1949 4 Sheets-Sheet 2
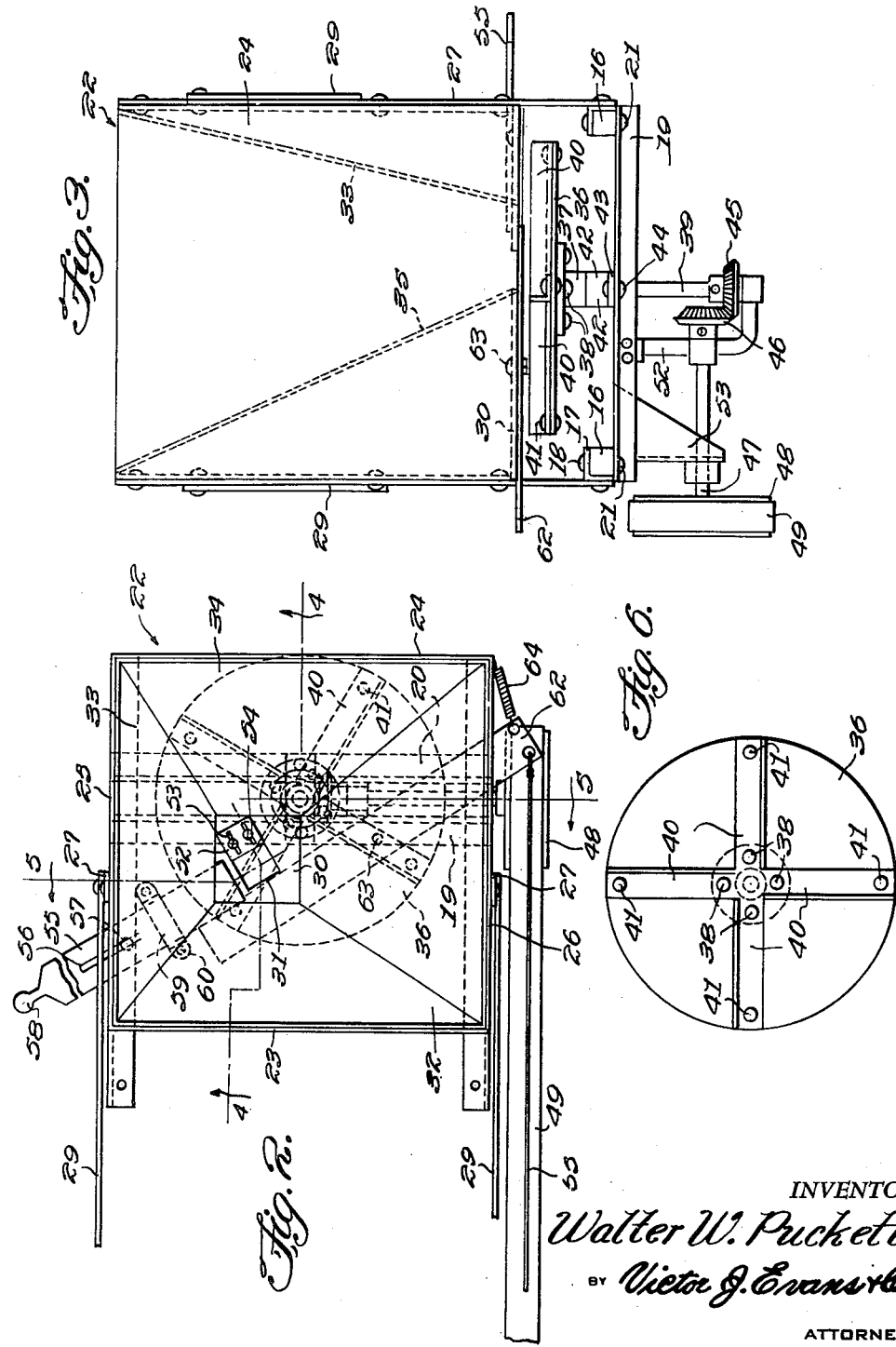
INVENTOR.
Walter W. Puckette,
BY Victor J. Evans & Co.
ATTORNEYS

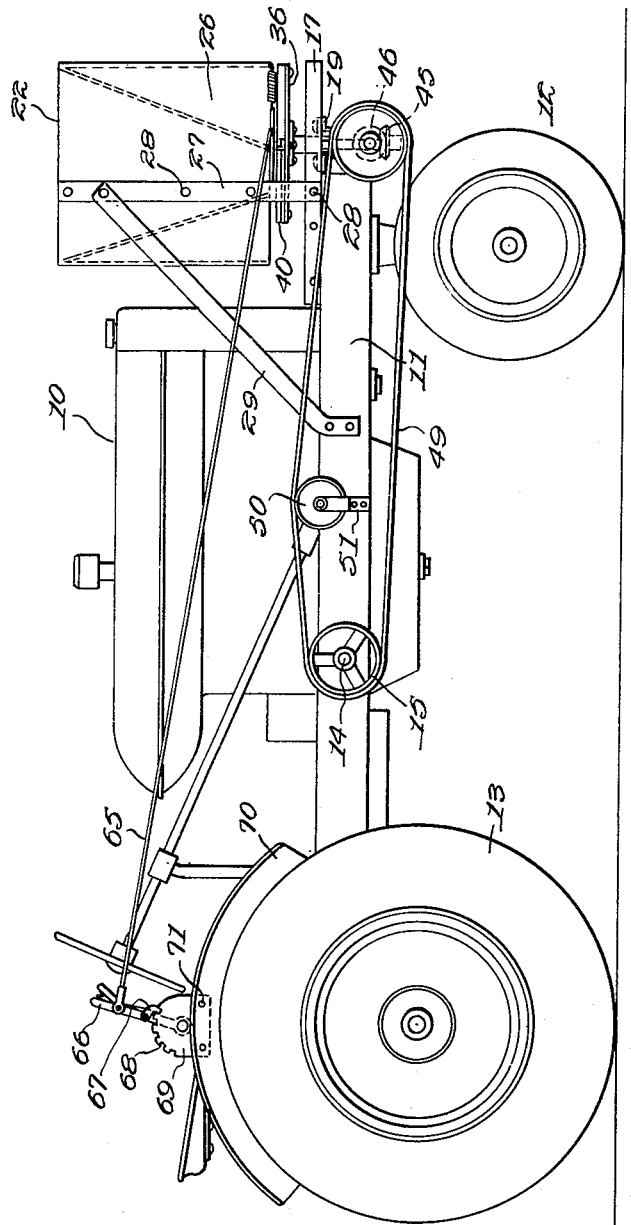

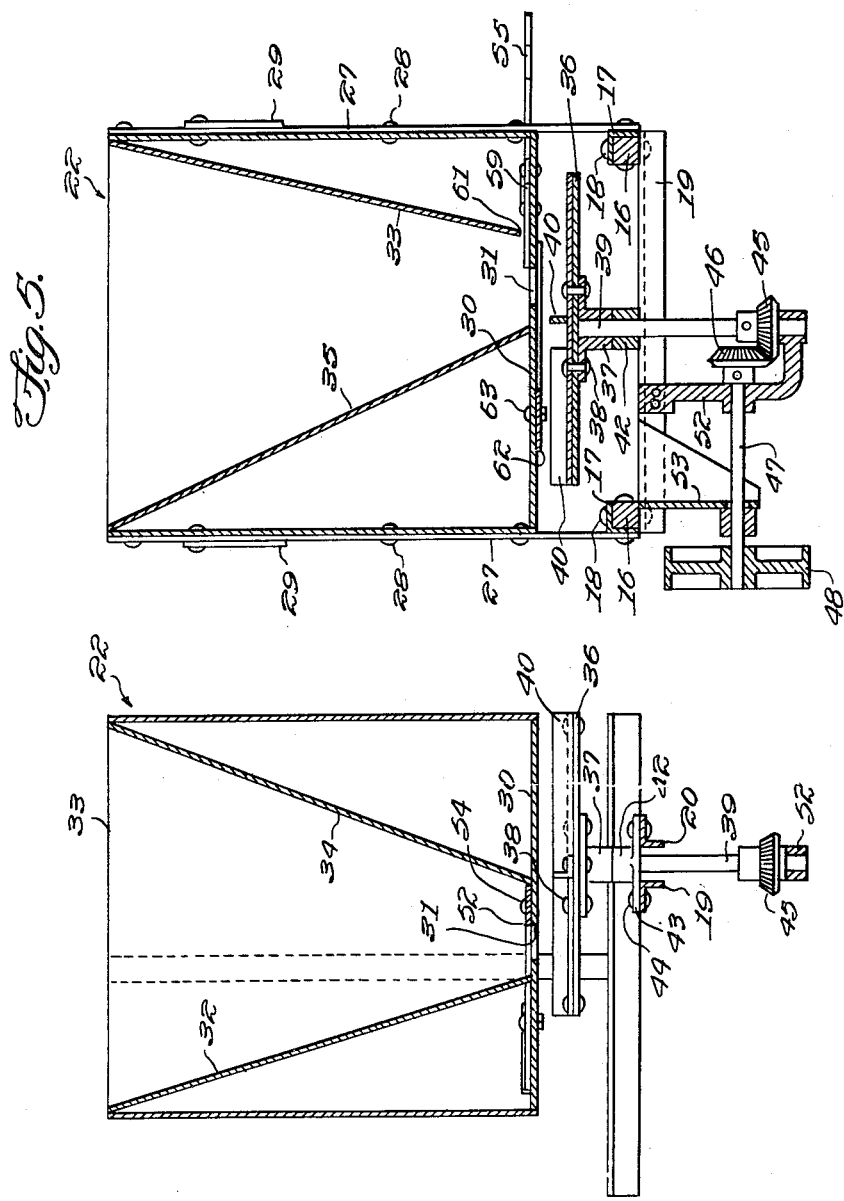

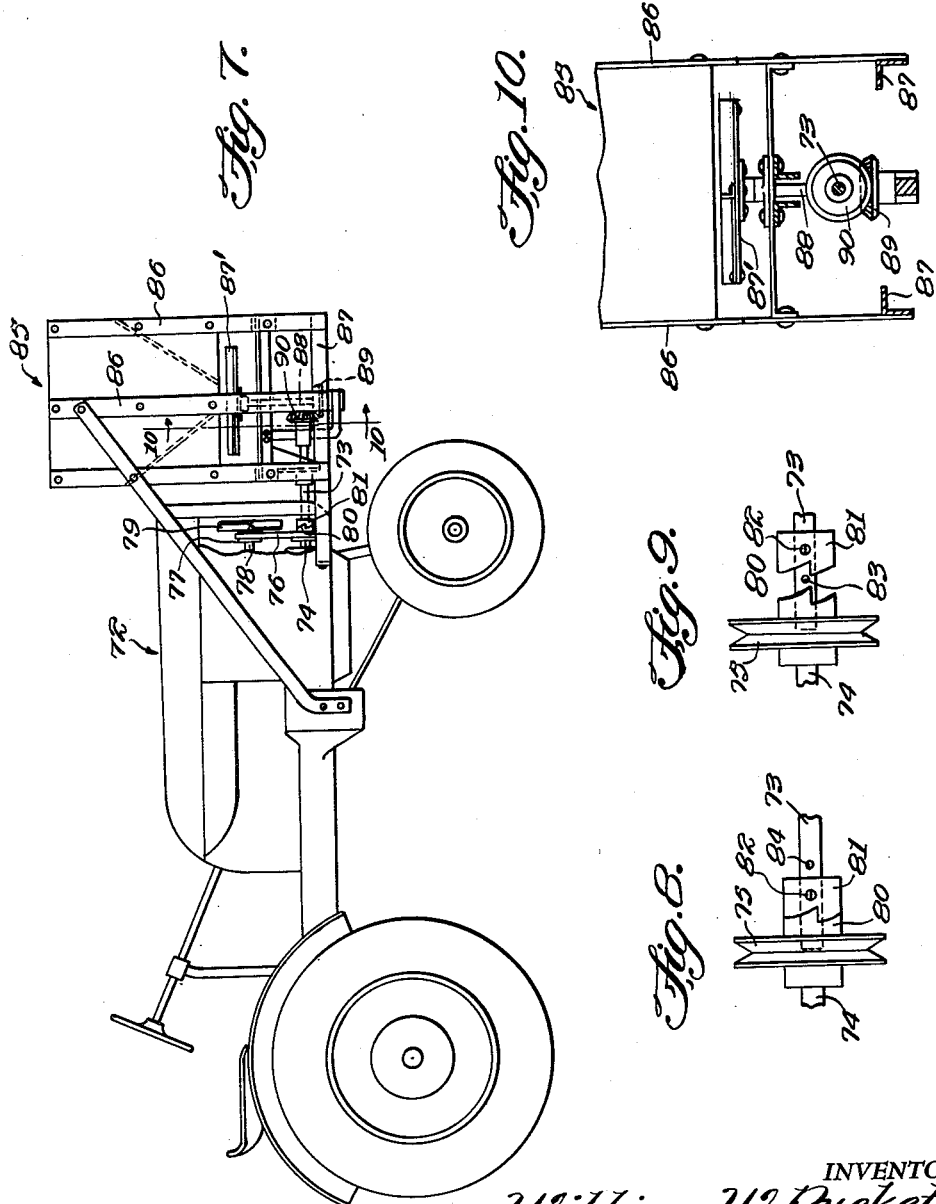

Patented Aug. 31, 1954

2,687,891

UNITED STATES PATENT OFFICE 2,687,891

SEED AND FERTILIZER DISTRIBUTOR FOR ATTACHMENT TO TRACTORS

Walter W. Puckette, Gladys, Va.

Application November 4, 1949, Serial No. 125,577

1 Claim. (Cl. 275—8)

This invention relates to agricultural equipment, and more particularly to a seed and fertilizer distributor for attachment to a tractor.

The object of the invention is to provide a seed-and-fertilizer-distributing mechanism which is adapted to be attached to the upper front end of a tractor, whereby the tractor operator can see where the seed or fertilizer is being sown, as well as observe the operation of the machine.

Another object of the invention is to provide a seed-and-fertilizer-distributing mechanism which is mounted on a tractor and operated by the tractor power take-off, the distributing mechanism adapted to be attached to various makes of tractors by making minor changes in the frame of the distributing machine.

Still another object of the invention is to provide a seed-and-fertilizer-distributing mechanism which includes a manually-operable means for controlling the rate or quantity of seed and fertilizer being dispensed, the seed or fertilizer being thrown in a wide semicircle as the tractor moves along the field.

A further object of the invention is to provide a seed-and-fertilizer distributor which is extremely simple and inexpensive to manufacture.

Other objects and advantages will be apparent during the course of the following description.

In the accompanying drawings forming a part of this application, and in which like numerals are used to designate like parts throughout the same:

Figure 1 is a side elevational view of the tractor with the distributor of the present invention attached thereto;

Figure 2 is a top plan view of the distributor;

Figure 3 is an end elevational view of the distributor;

Figure 4 is a sectional view taken on the line 4—4 of Figure 2;

Figure 5 is a sectional view taken on the line 5—5 of Figure 2;

Figure 6 is a top plan view of the rotary disc;

Figure 7 is a modified side elevational view showing the distributor of the present invention attached to a different type of tractor, and with parts broken away and in section;

Figure 8 is an enlarged fragmentary side elevational view showing a portion of the driving connection for the distributor of Figure 7;

Figure 9 is a view similar to Figure 8, but with the gears out of mesh;

Figure 10 is an enlarged sectional view taken on the line 10—10 of Figure 7.

Referring in detail to the drawings, the numeral 10 designates a conventional tractor which includes a chassis 11, front wheels 12 and large rear wheels 13, Figure 1. Further, the tractor is provided with a power take-off 14 which has a pulley 15 connected thereto for a purpose to be later described.

The present invention is directed to a mechanism for distributing seed or fertilizer, and the distributing mechanism is adapted to be supported on the front end of the tractor 10 and actuated by the latter. For attaching the distributor of the present invention to the tractor, a pair of horizontally-disposed, spaced-parallel wooden beams 16 are secured to the front of the chassis 11. An angle iron 17 is secured to each of the beams 16 by suitable securing elements, such as screws or bolt-and-nut members 18. Extending between the angle irons 17 is a pair of spaced-parallel angle irons 19 and 20, and the angle irons 19 and 20 are secured to the beams 16 by suitable securing elements 21.

The distributor of the present invention includes a hopper 22 which has its upper end open, whereby the hopper may be filled with seed, fertilizer and the like. The hopper 22 may be fabricated of any suitable material and includes vertically-disposed, spaced-parallel end walls 23 and 24, and extending between the end walls 23 and 24 is a pair of spaced-parallel vertically-disposed side walls 25 and 26.

For supporting the hopper 22, a vertically-disposed support member 27 is arranged contiguous to the outside wall 26 and the support member 27 is secured to the side wall 26 and to the angle irons 17 by suitable bolts 28. A similar support member 27 is arranged contiguous to the other side wall 25 and is secured thereto and to the angle irons 17 therebelow. For preventing the hopper 22 from accidentally moving, suitable inclined braces 29 each has an end secured to the support member 27 and the other end of each of the braces 29 is secured to the chassis 11.

The hopper 22 further includes a horizontally-disposed bottom wall or base 30 which is provided with a discharge opening 31 therein for a purpose to be later described. Also, the hopper 22 includes a plurality of inclined inner side and end panels or walls 32, 33, 34 and 35. These inner walls serve to guide the seed or fertilizer to the vicinity of the discharge opening 31.

Arranged below the discharge opening 31 is a rotary disc 36 which is adapted to receive materials discharged from the opening 31. A collar 37 is secured to the disc 36 by rivets 38, and the collar 37 is keyed or otherwise connected to the upper end of a vertically-disposed jack shaft 39, so that as the shaft 39 rotates, the disc 36 will also rotate. A plurality of angle irons 40 are secured to the upper surface of the disc 36 by suitable securing elements 41, so that the seed or fertilizer will be scattered in a semi-circle as the tractor moves along the field.

The collar 37 is rotatably supported on a bearing 42 which includes a flange 43 that is secured to the angle irons 19 and 20 by bolts or rivets 44, Figure 4. Connected to the lower end of the jack shaft 39 is a horizontally-disposed bevel gear 45 which is arranged in meshing engagement with a bevel gear 46, and the bevel gear 46 is connected to an end of a horizontally-disposed drive shaft 47. The pulley 48 is connected to the other or outer end of the drive shaft 47. A V-belt 49 is trained over the pulley 15, over the pulley 48, and the V-belt 49 also engages a press pulley 50, the press pulley 50 being supported by a bracket 51 which is secured to the tractor chassis 11, Figure 1. Thus, as the power take-off rotates the pulley 15, the pulley 48 will also be rotated to thereby turn or rotate the disc 36 and scatter the seed or fertilizer thereon. The horizontally-disposed drive shaft 47 is rotatably supported by a bearing arm 52 and a brace 53, Figure 5.

A means is provided for controlling the rate of flow of the seed or fertilizer through the discharge opening 31. This means includes a plate 52 which is slidably mounted on the bottom wall 30 of the hopper. The plate 52 is provided with a pair of spaced-parallel slots 53 and a screw 54 extends through each of the slots 53 and into the bottom wall or base 30 for maintaining the plate 52 immobile in its adjusted position. The plate 52 can be moved to restrict or enlarge the opening 31, as desired. An additional manually-operable means is provided for varying the size of the discharge opening 31. This last-named means comprises a lever or gate 55 which is provided with a slot 56, Figure 2, and the lever 55 is slidably supported on the bottom wall 30. A pin 57 projects through the slot 56 and into the bottom wall 30, so as to permit sliding movement of the lever 55. The lever 55 is provided with a handle 58 so that the lever can be conveniently gripped in the user's hand. The lever 55 is guided in its sliding movement by means of a cuff 59 which is secured to the bottom wall 30 by rivets or bolts 60. The lever 55 has its inner end projecting through a slot 61 which is arranged in the lower end of the inside wall 33, and the inner portion of the lever 55 can be moved into and out of closing relation with respect to the discharge opening 31.

Arranged below the discharge opening 31 and normally closing the discharge opening 31 is a horizontally-disposed lever 62. A pin or bolt-and-nut assembly 63 pivotally connects the lever 62 to the bottom wall 30, so that the lever 62 can be pivoted into and out of closing relation with respect to the discharge opening 31. A coil spring 64 has one end connected to the lever 62 and the other end of the coil spring is connected to the hopper 22, the coil spring 64 serving to normally urge the lever 62 into its open position, relative to the opening 31.

A means is provided for manually pivoting the lever 62 into the way of the opening 31, so as to prevent the seed or fertilizer from being discharged from the hopper 22 onto the disc 36. This manually operable means includes a wire or cable 65 that has its front end connected to the outer end of the lever 62.

The rear end of the cable 65 is connected to a hand lever 66, and the hand lever 66 carries a spring pressed pawl 67 which is mounted for movement into and out of engagement with one of the teeth 68 that are arranged in a plate 69. The plate 69 is secured to the tractor fender 70 by suitable securing elements 71.

In use, seed, fertilizer or other material is positioned in the hopper 22 and the plate 52 and the lever 55 are moved to their adjusted positions in order to have the discharge opening 31 of the desired size. The coil spring 64 normally maintains the lever 62 in its open position relative to the discharge opening 31, and when the tractor operator desires to stop the distribution of seed or fertilizer, the operator merely pulls back on the hand lever 66 which is conveniently arranged adjacent to the driver's seat.

The tractor is conventional and the pawl will hold the hand lever 66 in its adjusted position, so that the tractor operator's hands are free to operate the tractor. As the tractor moves along the field, the pulley 15 may be driven by the power take-off 14, and this in turn drives the pulley 48, since the belt 49 is trained over the pulleys 15 and 48. Rotation of the pulley 48 causes the drive shaft 47 to rotate and by means of the previously-described intermeshing bevel gears 45 and 46, this results in rotation of the vertically-disposed jack shaft 39. As the jack shaft 39 rotates, it causes rotation of the disc 36, so that material passing downwardly from the hopper 22 will be distributed in a wide semi-circle by the action of centrifugal force.

From the foregoing, it is apparent that a distributor has been provided which is adapted to be attached to the front end of a conventional tractor, whereby the operator can see where the seed or fertilizer is being sown, as well as observe the operation of the machine. Further, a means is provided whereby the tractor operator can readily stop or permit the distribution of feed or fertilizer. The seed or fertilizer being distributed drops off center on the left side of the disc 36 which rotates in a counterclockwise direction and is thrown in a semi-circle, whereby a wide space on the right side of the tractor is sown.

Referring in detail to Figures 7 through 10 of the drawings, the numeral 72 designates another type of tractor which is adapted to be equipped with the seed-and-fertilizer-distributing mechanism of the present invention. The tractor 72 differs from the tractor 10 of Figures 1 through 6 in that the tractor 72 has a different shaped chassis, and also the tractor 72 does not have the power take-off 14 on its side.

A means is provided for operating the distributing mechanism from the front of the tractor, and this means comprises a drive shaft 73 which is arranged in alignment with the tractor crankshaft 74. The crankshaft 74 has mounted thereon a pulley 75 which has trained thereover an endless belt 76. The belt 76 is also trained over a pulley 77 that is mounted on the fan shaft 78, so that the fan 79 is rotated to help cool the engine as the crankshaft 74 is rotated.

Mounted on the crankshaft 74 is a clutch gear 80, and a similar clutch gear 81 is slidably mounted on the drive shaft 73 and is adapted to be moved into and out of engagement with the clutch gear 80. For maintaining the clutch gear 81 immobile in its adjusted positions, a screw 82 extends through the clutch gear 81 and is adapted to be arranged in engagement with one of the threaded apertures 83 or 84 that are arranged in the drive shaft 73. Thus, by properly positioning the clutch gear 81, the drive shaft 73 can be selectively rotated.

The remaining portion of the distributing mechanism is substantially the same as the previously-described distributing mechanism of Figures 1 through 6. Thus, there is shown in Figures 7 through 10 a hopper 85 which is supported by vertically-disposed support members 86, the support members 86 having their lower ends secured to horizontally-disposed angle irons 87. These angle irons are secured to the front of the tractor 72 in any desired manner. The hopper 85 functions in the same manner as the previously-described hopper 22, and although the manually-operable means for controlling the discharge of seed and fertilizer from the bottom of the hopper 85 has not been shown, nevertheless the same control means as shown in Figures 1 through 6 is adapted to be used therewith.

For throwing the seed or fertilizer in a wide arc as the tractor moves along the field, a horizontally-disposed disc 87' is arranged below the hopper 85. The disc 87' is connected to the upper end of a vertically-disposed jack shaft 88, and mounted on the lower end of the jack shaft 88 is a bevel gear 89. The bevel gear 89 is arranged in meshing engagement with a bevel gear 90 that is mounted on the front end of the drive shaft 73.

In use, seed or fertilizer is placed in the hopper 85, and the tractor 72 is driven along the field, and the flow or discharge of seed or fertilizer from the hopper 85 onto the disc 87' can be selectively controlled. The disc 87' is rotated in order to throw the seed or fertilizer in a wide semi-circle as the tractor moves along the field. For causing this rotation of the disc 87', it is to be noted that the disc 87' is mounted on the upper end of the vertically-disposed jack shaft 88, which has on its lower end the bevel gear 89, the bevel gear 89 being arranged in meshing engagement with the bevel gear 80. The bevel gear 90 is mounted on an end of the drive shaft 73, and rotation of the drive shaft 73 is caused by the clutch gear 81 being arranged in engagement with the clutch gear 80, as shown in Figure 8. Thus, the rotation of the engine crankshaft 74 causes the clutch gear 80 to rotate, which in turn causes rotation of the clutch gear 81 and consequently causes the disc 87' to turn. When the disc 87' is not being used, as when the tractor is being driven along a highway, a means is provided for preventing the tractor engine from rotating the disc 87'. Thus, the securing element or screw 82 is unscrewed from the threaded opening 83 and the clutch gear 81 is slid from the position shown in Figure 8 to the position shown in Figure 9. Then, the screw 82 is again tightened or moved into engagement with the aperture 84, so that rotation of the crankshaft 74 will not now cause rotation of the drive shaft 73. Thus, it is apparent that the distributing mechanism of the present invention can be adapted to all makes of tractors.

What is claimed is:

A distributing hopper comprising a rectangular-shaped base having an off center opening therein, inclined panels extended upwardly from the base and positioned to guide material to said opening, a plate having spaced slots therein positioned on the base and clamped by elements extended through the slots to the base for adjusting the area of said opening, a gate slidably mounted on said base and positioned to coact with said plate for regulating the area of said opening, said gate having a handle extended from one side of the hopper, a lever positioned against the under surface of the base, means pivotally mounting the lever on the base with one end positioned to close the opening through the base and with the opposite end extended from the hopper to provide means for connecting a cable to the lever, said cable being adapted to extend to the seat of an operator of a tractor upon which the hopper may be mounted, and resilient means for actuating the lever whereby the lever closes the opening of the base of the hopper when released by the cable, said opening being adapted to guide grain dropped from the hopper upon a distributing element mounted below the hopper and positioned whereby material passing through the off-center opening of the base is distributed over a semi-circular area at one side of the hopper.

References Cited in the file of this patent

UNITED STATES PATENTS

| Number | Name | Date |
| --- | --- | --- |
| 1,485,032 | Janes | Feb. 26, 1924 |
| 1,764,019 | Herdenbergh | June 17, 1930 |
| 2,243,983 | Shaw | June 3, 1941 |
| 2,256,655 | Stewart | Sept. 23, 1941 |
| 2,302,413 | Blackwelder et al. | Nov. 17, 1942 |
| 2,334,376 | Bauer | Nov. 16, 1943 |
| 2,418,271 | Meincke | Apr. 1, 1947 |
| 2,463,855 | Crawford | Mar. 8, 1949 |
| 2,525,546 | Harris | Oct. 10, 1950 |
| 2,565,427 | Herd | Aug. 21, 1951 |